US012094398B2

(12) United States Patent
Hsu et al.

(10) Patent No.: US 12,094,398 B2
(45) Date of Patent: Sep. 17, 2024

(54) DISPLAY DEVICE WITH NON-RECTANGULAR ACTIVE AREA AND PIXEL STRUCTURE THEREOF

(71) Applicant: AUO Corporation, Hsin-Chu (TW)

(72) Inventors: Ya-Ling Hsu, Hsin-Chu (TW); Peng-Bo Xi, Hsin-Chu (TW)

(73) Assignee: AUO CORPORATION, Hsin-Chu (TW)

( * ) Notice: Subject to any disclaimer, the term of this patent is extended or adjusted under 35 U.S.C. 154(b) by 0 days.

(21) Appl. No.: 17/988,205

(22) Filed: Nov. 16, 2022

(65) Prior Publication Data

US 2023/0267874 A1 Aug. 24, 2023

(30) Foreign Application Priority Data

Feb. 24, 2022 (TW) .................................. 111106831
Jul. 5, 2022 (TW) .................................. 111125230

(51) Int. Cl.
*G09G 3/32* (2016.01)

(52) U.S. Cl.
CPC ....... *G09G 3/32* (2013.01); *G09G 2300/0452* (2013.01); *G09G 2320/0271* (2013.01)

(58) Field of Classification Search
None
See application file for complete search history.

(56) References Cited

U.S. PATENT DOCUMENTS 10,923,537 B2 2/2021 Zhang
2016/0291376 A1* 10/2016 Iwatsu .............. G02F 1/133512
2017/0018238 A1* 1/2017 Kang .................. G09G 3/2074
2019/0103065 A1* 4/2019 Li ........................ G09G 3/3648
2019/0164510 A1* 5/2019 Fang .................... G09G 3/3611
2019/0198581 A1* 6/2019 Kim .......................... G02F 1/13
2020/0035141 A1* 1/2020 Yang ........................ G09G 3/20
2020/0202817 A1* 6/2020 Li ............................ G09G 5/30
2020/0365102 A1* 11/2020 Chang ...................... G09G 3/36
2021/0375191 A1* 12/2021 Sun .......................... G09G 3/22

FOREIGN PATENT DOCUMENTS

CN 107092123 B 2/2020
CN 111833807 A 10/2020
CN 112882611 A 6/2021
CN 113241031 A 8/2021
TW I557487 B 11/2016

* cited by examiner

*Primary Examiner* — Patrick N Edouard
*Assistant Examiner* — Peijie Shen
(74) *Attorney, Agent, or Firm* — WPAT, P.C

(57) ABSTRACT

A display device comprising a plurality of ordinary pixels, an auxiliary pixel, a frame and a driving chip is provided. The auxiliary pixel includes a plurality of first color sub-pixels. The frame is configured to define an active area in a non-rectangular shape. The plurality of ordinary pixels and the auxiliary pixel are arranged in the active area. The driving chip is configured to receive display data, wherein the display data includes a first color grayscale value configured to assign first target luminance of first color light of the auxiliary pixel. The driving chip is configured to generate one or more processed first color grayscale values configured to assign the luminance of the plurality of first color sub-pixels, according to the first color grayscale value, and the sum of the luminance of the plurality of first color sub-pixels is substantially equal to the first target luminance.

20 Claims, 8 Drawing Sheets

100

DISPLAY DEVICE WITH NON-RECTANGULAR ACTIVE AREA AND PIXEL STRUCTURE THEREOF

RELATED APPLICATIONS

This application claims priority to Taiwan Application Serial Number 111106831 filed on Feb. 24, 2022, and Taiwan Application Serial Number 111125230 filed on Jul. 5, 2022, which are herein incorporated by reference in their entirety.

BACKGROUND

Field of Invention

The disclosure is related to the field of display technology. More particularly, the disclosure is related to a display device with a non-rectangular active area and the pixel structure thereof.

Description of Related Art

In order to improve the practicability and keep the aesthetics of appearance of the product in the same time, non-rectangular display devices are generally used in wearable devices and automotive devices. The non-rectangular display device can be implemented by covering a part of the rectangular panel with a frame, and by adjusting the hollow area of the frame, the active area of the non-rectangular display device can take on various shapes. However, in this way, the pixels at the boundary of the active area may be blocked by the frame and cannot be fully exposed, thus the color difference may exist at the boundary of the active area. For example, the frame may partially block the blue sub-pixels in some pixels, which makes the boundary of the active area have a yellow tint.

The non-rectangular display devices can also be implemented by arranging pixels in various shapes. In this way, each pixel can be fully exposed without being blocked by the frame, but the user will observe obvious jagged shapes at the boundary of the active area. In conclusion, the boundaries of the images generated by the existing non-rectangular display devices have color difference or jaggedness, which is unfavorable to the quality improvement of the product.

SUMMARY

The disclosure provides a display device comprising a plurality of ordinary pixels, an auxiliary pixel, a frame and a driving chip. The auxiliary pixel includes a plurality of first color sub-pixels. The frame is configured to define an active area in a non-rectangular shape. The plurality of ordinary pixels and the auxiliary pixel are arranged in the active area. The driving chip is configured to receive a display data, wherein the display data includes a first color grayscale value and the first color grayscale value is configured to assign a first target luminance of a first color light of the auxiliary pixel. The driving chip is configured to generate one or more processed first color grayscale values according to the first color grayscale value, the one or more processed first color grayscale values are configured to assign the luminance of the plurality of first color sub-pixels, and the sum of the luminance of the plurality of first color sub-pixels is substantially equal to the first target luminance.

The disclosure also provides a display device comprising a plurality of ordinary pixels, an auxiliary pixel and a frame. Each of the plurality of ordinary pixels includes a first color sub-pixel. The auxiliary pixel includes a plurality of first color sub-pixels. The frame is configured to define an active area in a non-rectangular shape. The plurality of ordinary pixels and the auxiliary pixel are arranged in the active area. When a display data input to the display device assigns the plurality of ordinary pixels and the auxiliary pixel to generate a first color light with the same luminance, the sum of the luminance of the plurality of first color sub-pixels of the auxiliary pixel is substantially equal to the luminance of the first color sub-pixel of one of the plurality of ordinary pixels.

The disclosure provides a pixel structure comprising an ordinary pixel and an auxiliary pixel. The ordinary pixel includes a first color sub-pixel. The auxiliary pixel includes a plurality of first color sub-pixels. When the ordinary pixel and the auxiliary pixel generate a first color light with the same luminance, the sum of the luminance of the plurality of first color sub-pixels of the auxiliary pixel is substantially equal to the luminance of the first color sub-pixel of the ordinary pixel.

One of the advantages of the above-mentioned display devices and pixel structure is that the smoothness of the boundary of the image can be improved.

Another advantage of the above-mentioned display devices and pixel structure is that it can avoid the occurrence of color difference at the boundary of the active area.

It is to be understood that both the foregoing general description and the following detailed description are by examples, and are intended to provide further explanation of the disclosure as claimed.

DETAILED DESCRIPTION

Figure 1:
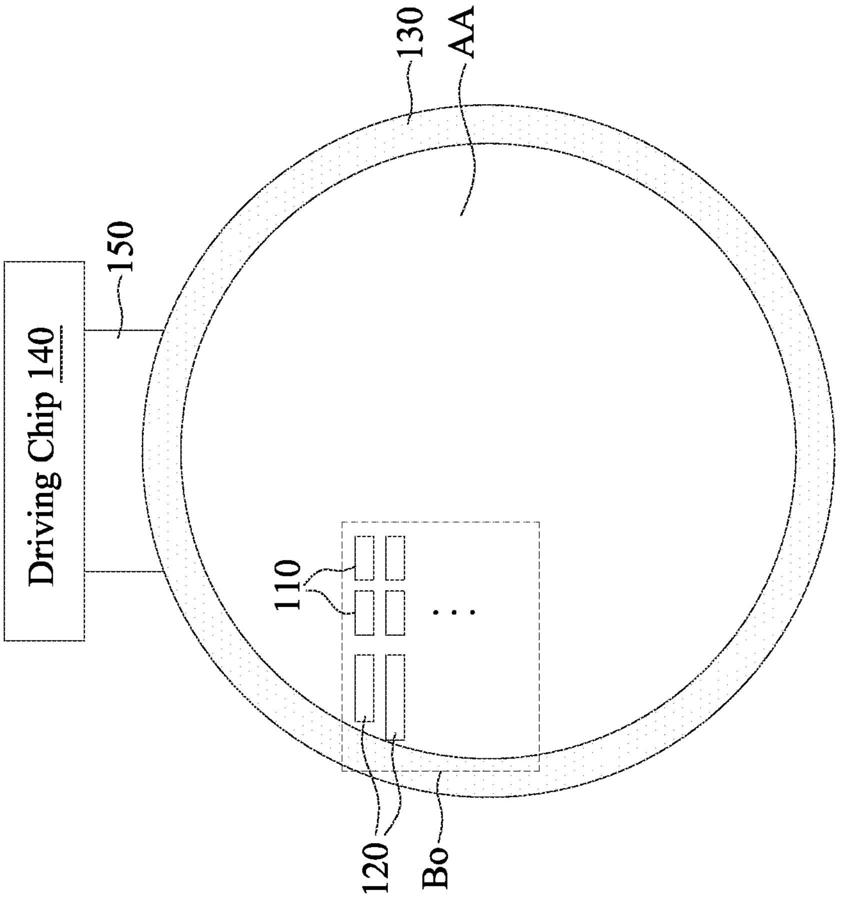
FIG. 1 is a simplified functional block diagram of a display device in accordance with an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a simplified functional block diagram of a display device 100 in accordance with an embodiment of the present disclosure. The display device 100 comprises a plurality of ordinary pixels 110, a plurality of auxiliary pixels 120, a frame 130, a driving chip 140 and connecting lines 150. The frame 130 is configured to define a non-rectangular active area AA of the display device 100, and the active area AA refers to an area where the display device 100 displays images. The ordinary pixels 110 and the auxiliary pixels 120 are distributed in the active area AA, and the auxiliary pixels 120 are generally arranged around the ordinary pixels 110, that is, the auxiliary pixels 120 are located between the ordinary pixels 110 and the frame 130, but do not need to completely surround the ordinary pixels 110. The driving chip 140 is coupled to the ordinary pixels 110 and the auxiliary pixels 120 through the connecting lines 150, and is configured to provide various display driving signals to the ordinary pixels 110 and the auxiliary pixels 120. For the sake of simplicity, other elements and connection relationships in the display device 100 are not illustrated in FIG. 1.

Figure 2A:
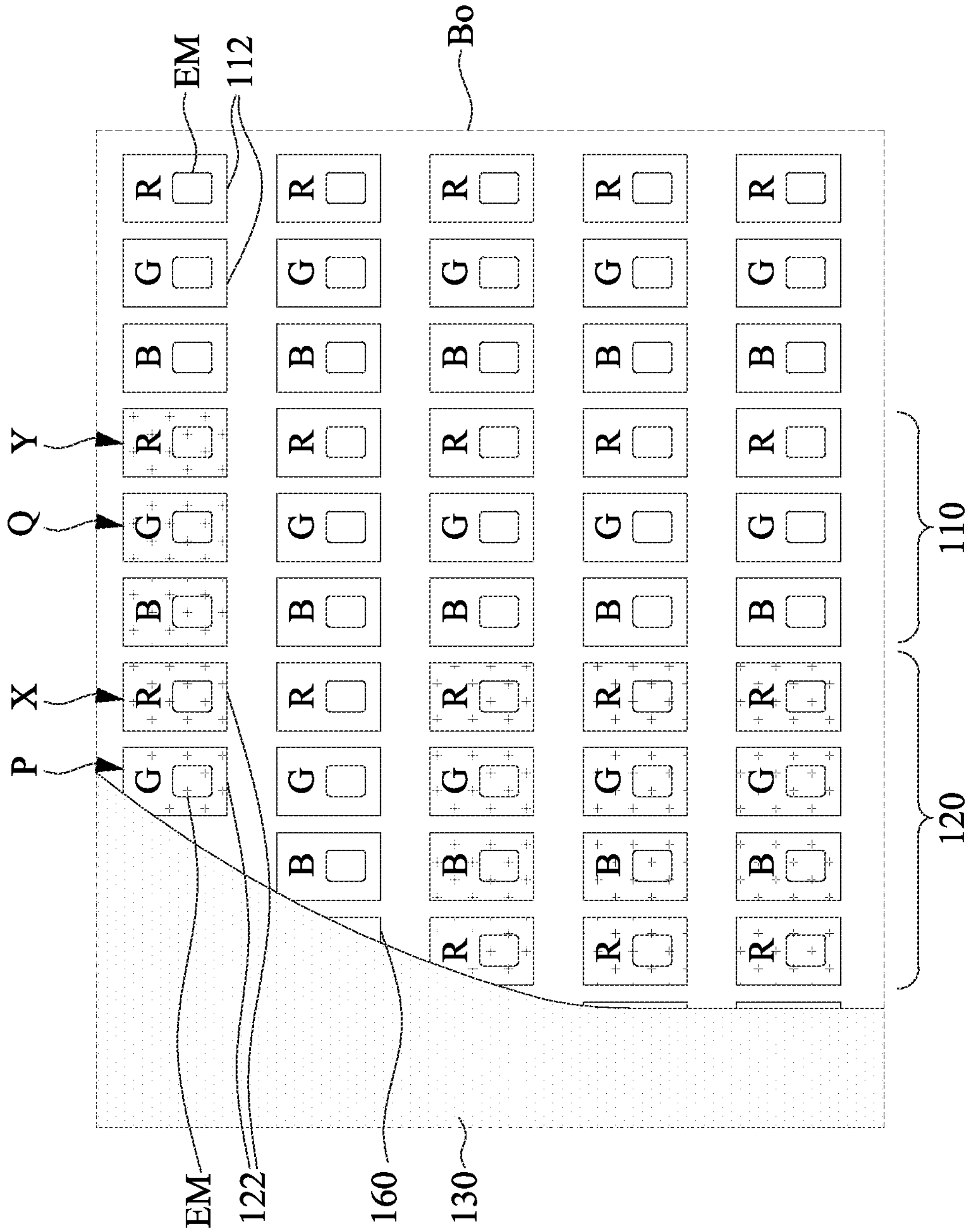
FIG. 2A is an enlarged schematic diagram of an area in FIG. 1 in accordance with an embodiment of the present disclosure.

FIG. 2A is an enlarged schematic diagram of an area Bo in FIG. 1. As shown in FIG. 2A, each ordinary pixel 110 (not filled with dots) includes three sub-pixels 112 (respectively indicated by the letter "R", "G" and "B") that are red, green, and blue, but the present disclosure is not limited thereto. In some embodiments, each ordinary pixel 110 includes a plurality of sub-pixels 112 with different colors, each auxiliary pixel 120 (filled with dots) includes a plurality of sub-pixels 122, and these sub-pixels 122 include sub-pixels 122 with the same color. In some embodiments, the number of sub-pixels 122 in the auxiliary pixels 120 is greater than or equal to the number of sub-pixels 112 in the ordinary pixels 110. The colors of the sub-pixels 122 are arranged in sequence according to a specific order (e.g., red, green and blue). Taking FIG. 2A as an example, if the auxiliary pixel 120 has five sub-pixels 122 (e.g., the auxiliary pixels 120 in the first row from the top of FIG. 2A), the five sub-pixels 122 are arranged from the interior of the area AA to the frame 130 in a horizontal direction, and its colors are red, green, blue, red and green in sequence, and so on. The sub-pixels 122 with repeated colors in the auxiliary pixels 120 are used to fill the active area AA as much as possible, so as to reduce the distance between the auxiliary pixels 120 and the frame 130, thereby improving the smoothness of the boundary of the image displayed by the display device 100.

As shown in FIG. 2A, the sub-pixel 112 and the sub-pixel 122 include a light-emitting area EM, a light-emitting element is provided in the light-emitting area EM, and an area other than the light-emitting area EM in the sub-pixel 112 and the sub-pixel 122 may be provided with a transistor driving circuit. The ordinary pixels 110, the auxiliary pixels 120 and the frame 130 are disposed on a substrate (not shown, such as a glass substrate) of the display device 100, and the vertical projection of the plurality of light-emitting areas EM in the auxiliary pixels 120 on the substrate (can be realized as the projection in the direction perpendicular to the plane of the drawing of FIG. 2A) do not overlap the vertical projection of the frame 130 on the substrate. In this way, the light of each color in the auxiliary pixels 120 will not be blocked by the frame 130, thus the boundary of the active area AA will not have a color difference.

In some embodiments, the ordinary pixels 110 and the auxiliary pixels 120 are light-emitting diode pixel circuits, that is, the light-emitting components in the light-emitting areas EM are implemented with light-emitting diodes. The aforementioned light emitting diode may be an organic light emitting diode (OLED) or a micro light emitting diode (Micro LED). The light emitting diode has the advantage of being small in size, so it can be arranged close to the boundary of the frame 130 without being blocked by the frame 130, which helps to improve the smoothness of the boundary of the image displayed by the display device 100.

Figure 2B:
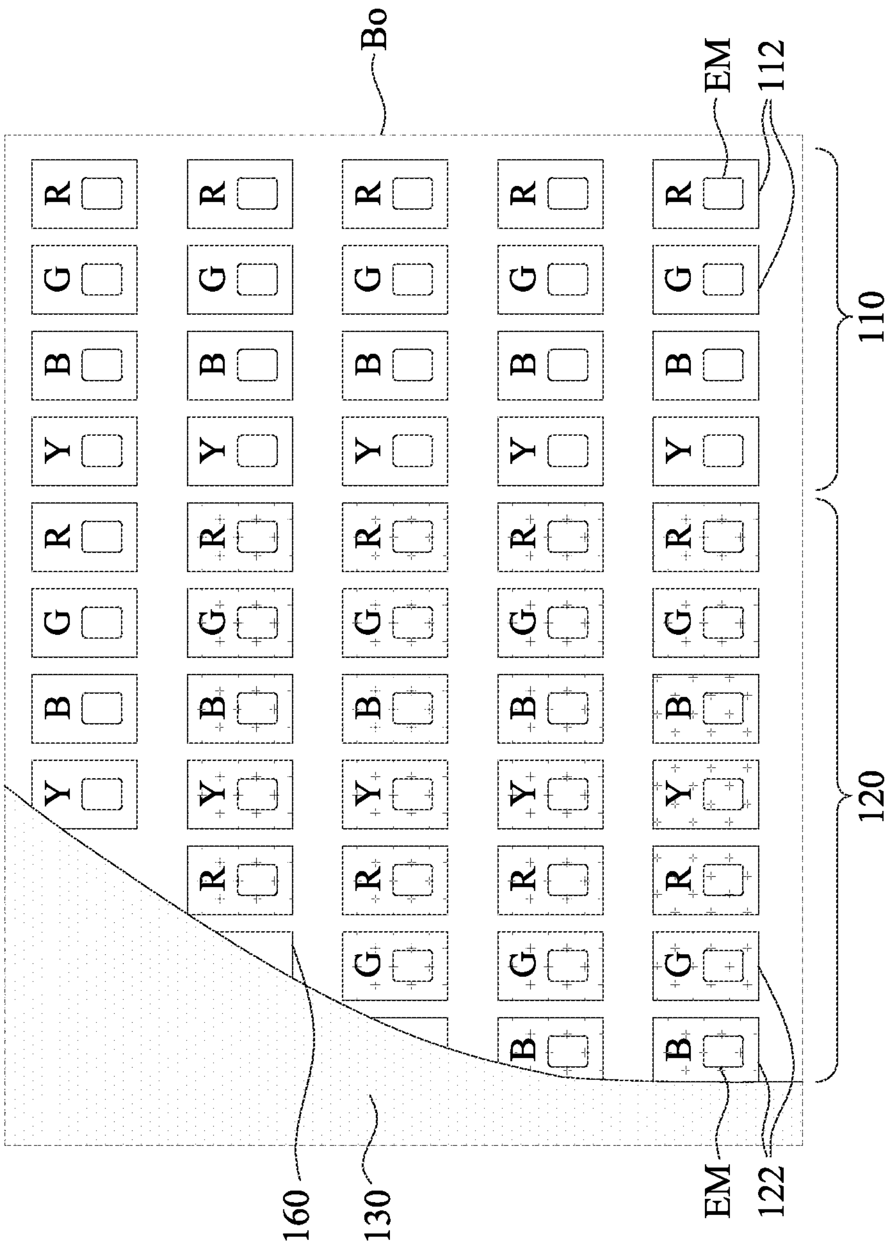
FIG. 2B is an enlarged schematic diagram of an area in FIG. 1 in accordance with an embodiment of the present disclosure.
Figure 2C:
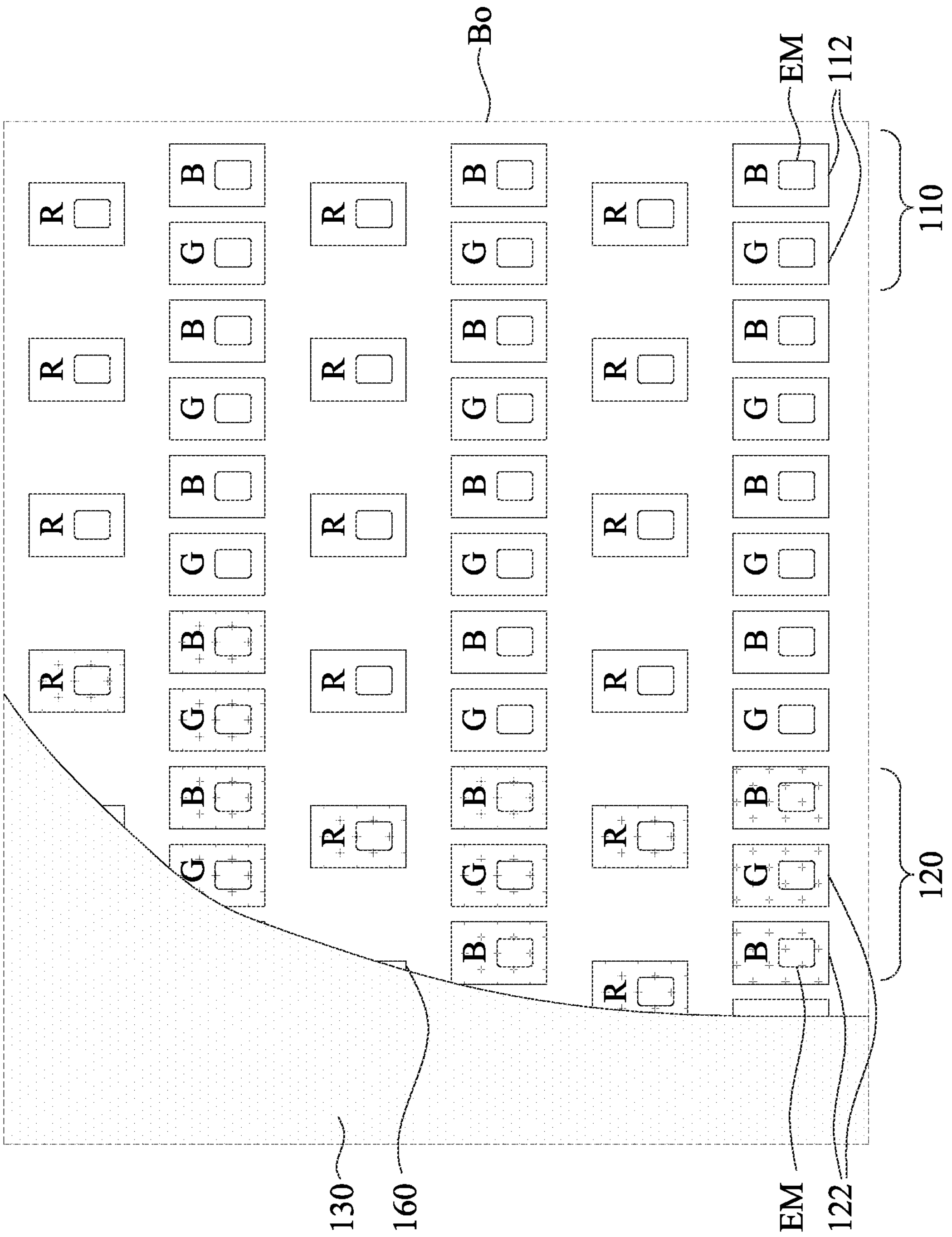
FIG. 2C is an enlarged schematic diagram of an area in FIG. 1 in accordance with an embodiment of the present disclosure.

The ordinary pixels 110 and the auxiliary pixels 120 in FIG. 2A are merely examples, and various suitable configurations of the ordinary pixels 110 and the auxiliary pixels 120 are within the scope of present disclosure. For example, the ordinary pixels 110 and the auxiliary pixels 120 may be a four primary color arrangement as shown in FIG. 2B or a pentile arrangement as shown in FIG. 2C. As shown in FIG. 2B, in some embodiments of the four-primary color arrangement, each ordinary pixel 110 (not filled with dots) includes sub-pixels 112 with different colors (respectively indicated by the letter "R", "G", "B" and "Y") that are red, green, blue and yellow, each auxiliary pixel 120 (filled with dots) includes at least four sub-pixels 122, and these sub-pixels 122 include sub-pixels 122 with the same color. As shown in FIG. 2C, in some embodiments of the pentile arrangement, each ordinary pixel 110 (not filled with dots) includes sub-pixels 112 with different colors (respectively indicated by the letter "R", "G" and "B") that are red, green and blue, each auxiliary pixel 120 (filled with dots) includes at least three sub-pixels 122, and these sub-pixels 122 include sub-pixels 122 with the same color. In some embodiments, as shown in FIGS. 2A-2C, the display device 100 further includes a plurality of dummy pixels 160, and the light-emitting areas of these dummy pixels 160 are completely blocked by the frame 130, thus the dummy pixels 160 will not cause color difference at the boundary of the active area AA.

When the display device 100 is used to drive the auxiliary pixel 120 to generate light of a certain color with target luminance, the display device 100 will allocate the target luminance to the corresponding color according to the number of sub-pixels 122 of the color in the auxiliary pixel 120, which makes the sum of the luminance of the sub-pixels 122 of the color is substantially equal to the target luminance. In this way, the sub-pixels 122 of the same color in the auxiliary pixel 120 will not cause color difference at the boundary of the active area AA. In some embodiments, the term "substantially equal to" may mean that the sum of the luminance differs from the target luminance by within 5%. In other embodiments, the term "substantially equal to" may mean that the sum of the luminance differs from the target luminance by within 10%.

For example, please refer to FIG. 2A again, if the display device 100 is used to make the auxiliary pixel 120 generate red light with a target luminance of 100 nits, and the auxiliary pixel 120 comprises two red sub-pixels 122 (e.g., the red sub-pixels 122 indicated by the letter "X" and "Y"), the display device 100 will set the total luminance of the two red sub-pixels 122 at 100 nits, for example, 50 nits and 50 nits, respectively. Similarly, if the display device 100 is used to make the auxiliary pixel 120 generate green light with a target luminance of 80 nits, and the auxiliary pixel 120 comprises two green sub-pixels 122 (e.g., the green sub-pixels 122 indicated by the letter "P" and "Q"), the display device 100 will set the total luminance of the two green sub-pixels 122 at 80 nits.

In some embodiments, for sub-pixels 122 of the same color in the auxiliary pixels 120, the luminance is positively correlated with the distance from the frame 130. For example, please refer to FIG. 2A, the red sub-pixel 122 indicated by the letter "X" in FIG. 2A is closer to the frame 130 than the red sub-pixel 122 indicated by the letter "Y", thus when the target luminance of the red color light is 100 nits, the luminance of the red sub-pixel 122 indicated by the letter "X" can be a lower 30 nits, and the luminance of the red sub-pixel 122 indicated by the letter "Y" can be a higher 70 nits. In this way, the position of the red light source perceived by the user will be closer to the red sub-pixel 122 indicated by the letter "Y". The advantage of this configuration is that the effect of light mixing of the auxiliary pixel 120 and the ordinary pixel 110 will tend to be consistent.

Figure 3:
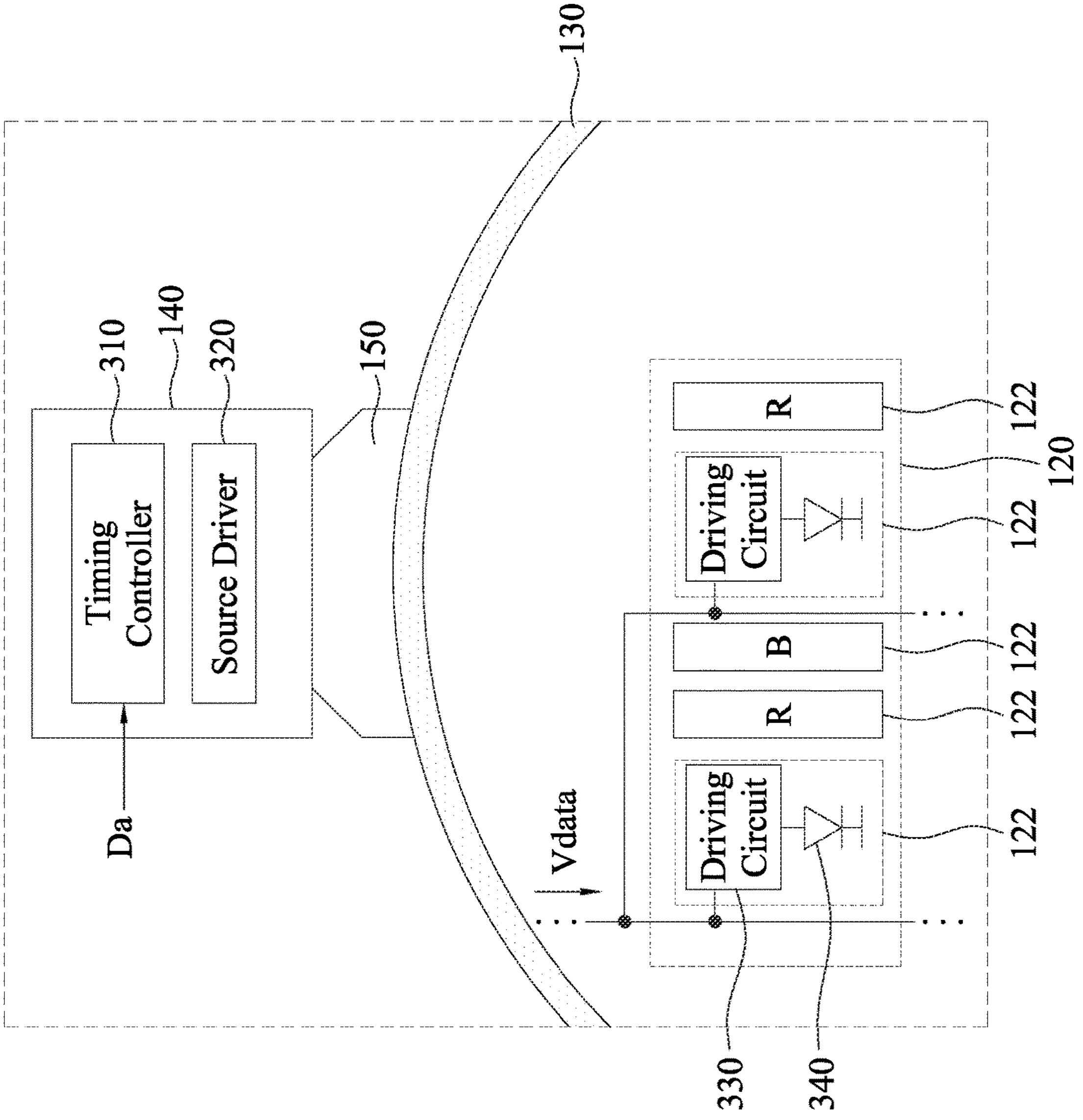
FIG. 3 is a partially enlarged schematic diagram of a display device in accordance with another embodiment of the present disclosure.

In conclusion, the display device 100 can assign the sub-pixels 122 of the same color in the auxiliary pixels 120 to have the same or different luminance, which makes the total luminance of the sub-pixels 122 substantially equal to the target luminance. The embodiment in which the sub-pixels 122 of the same color are assigned to have the same luminance will be further described below with reference to FIGS. 3-4. FIG. 3 is a partially enlarged schematic diagram of a display device 100 in accordance with an embodiment of the present disclosure. The driving chip 140 includes a timing controller 310 and a source driver 320. The timing controller 310 is configured to receive display data Da. The display data Da includes the grayscale values of the light in each color of each ordinary pixel 110 and each auxiliary pixel 120 in FIGS. 1-2. For example, the display data Da can assign that the blue light, red light and green light generated by the auxiliary pixels 120 correspond to grayscale 0, 255 and 255, respectively, so that the user can perceive the yellow light.

For convenience of description, FIG. 3 only shows one auxiliary pixel 120 to represent the auxiliary pixel 120 in FIGS. 1-2, and the ordinary pixels 110 in FIGS. 1-2 are omitted. The auxiliary pixel 120 includes two red sub-pixels 122 (indicated by the letter "R"), two green sub-pixels 122 (illustrated with internal circuits) and one blue sub-pixel 122 (indicated by the letter "B"). The red and blue sub-pixels 122 are similar to the green sub-pixels 122, and the difference lies in the colors of the light-emitting elements, thus the circuit structures of the red and blue sub-pixels 122 are omitted in FIG. 3. The operation of the embodiment of FIG. 3 will be described below by taking the green sub-pixel 122 as an example.

The timing controller 310 processes the grayscale value of the green light (hereinafter referred to as "green grayscale value") associated with the auxiliary pixel 120 in the display data Da according to the number of the green sub-pixels 122 in the auxiliary pixel 120 to generate a processed green grayscale value. The green grayscale value is used to assign the target luminance of the green light generated by the auxiliary pixel 120, and the processed green grayscale value is used to assign the luminance of a plurality of green sub-pixels 122 so that the total luminance of the green sub-pixels 122 is substantially equal to the target luminance. The source driver 320 is configured to provide the same data voltage Vdata to the plurality of green sub-pixels 122 according to the processed green grayscale value. That is, the plurality of green sub-pixels 122 in this embodiment receive the data voltage Vdata from the same data line and thus have the same luminance value. The green sub-pixel 122 includes a driving circuit 330 and a light-emitting element 340, wherein the driving circuit 330 is configured to provide a driving current to the light-emitting element 340 according to the data voltage Vdata to make the light-emitting element 340 emit light.

Figure 4:
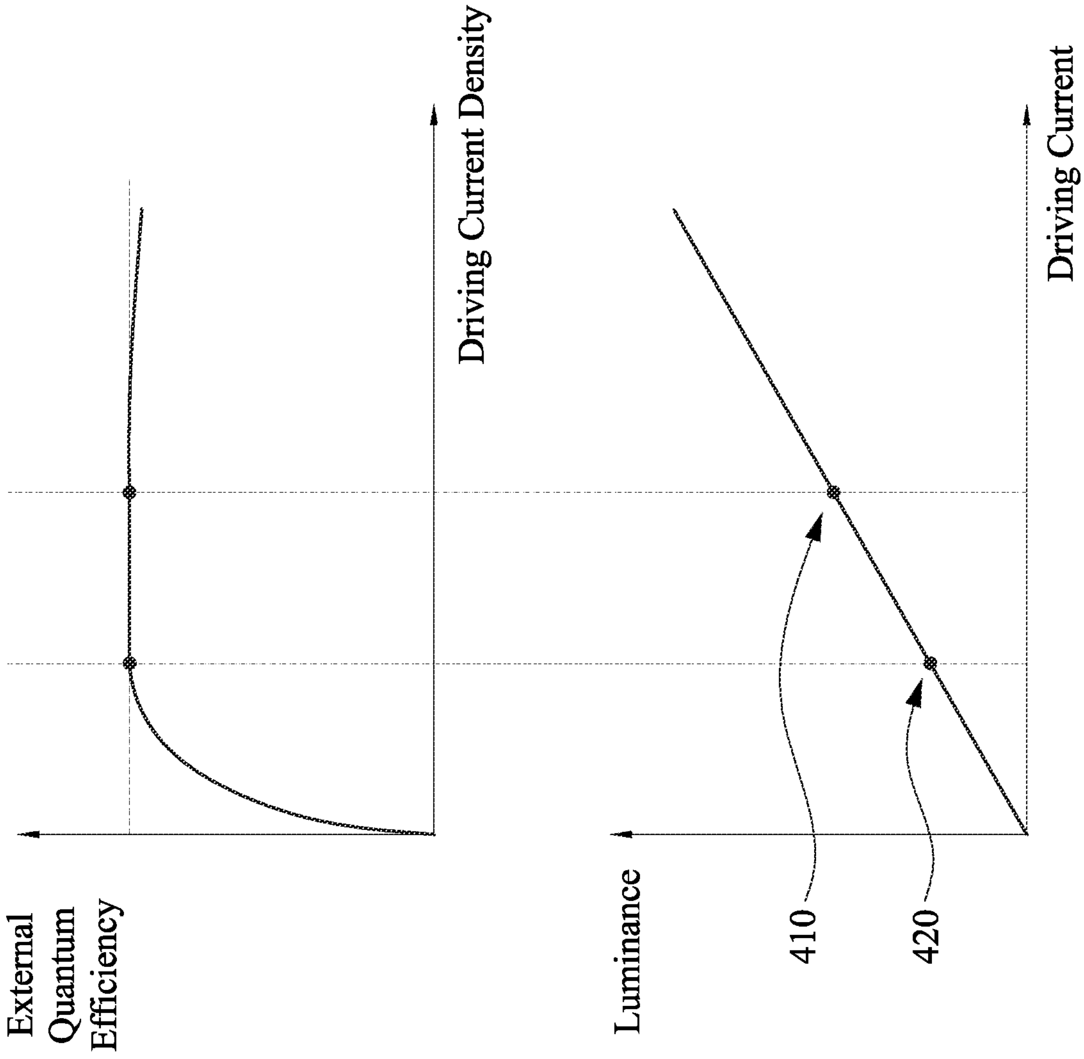
FIG. 4 is a schematic diagram of the relationship between the luminance and the driving current of a sub-pixel.

Please refer to FIGS. 3-4 at the same time. FIG. 4 is a schematic diagram of the relationship between the luminance and the driving current of the green sub-pixel 122. As shown in FIG. 4, when the external quantum efficiency curve is approximately horizontal, the luminance of the green sub-pixel 122 and its driving current are approximately linearly related, wherein the target luminance is indicated by a reference numeral 410, and the luminance of each green sub-pixel 122 is indicated by a reference numeral 420. The timing controller 310 can easily calculate the aforementioned processed grayscale values according to the linear relationship and/or a gamma correction curve stored in the source driver 320.

It is worth noting that the target luminance (indicated by the reference numeral 410) and the current corresponding to the target luminance (hereinafter referred to as target current) in FIG. 4 can be understood as the luminance and current that a single green sub-pixel 112 of an ordinary pixel 110 would have when the ordinary pixel 110 provides the target luminance. In the case that the auxiliary pixel 120 has M green sub-pixels 122, 1/M the target current flows through each green sub-pixel 122 and each green sub-pixel 122 has 1/M target luminance, where M is a positive integer. For example, since the auxiliary pixel 120 in FIG. 3 has two green sub-pixels 122, half the target current flows through each green sub-pixel 122 and each green sub-pixel 122 has half the target luminance. In other words, under the condition that the green grayscale value is fixed, the current and luminance of the green sub-pixels 122 are negatively correlated with the total number of the green sub-pixels 122. The operations of the sub-pixels 122 of the other color in the auxiliary pixel 120 are similar to the aforementioned description about the green sub-pixel 122 and are not repeated here for the sake of brevity.

Figure 5:
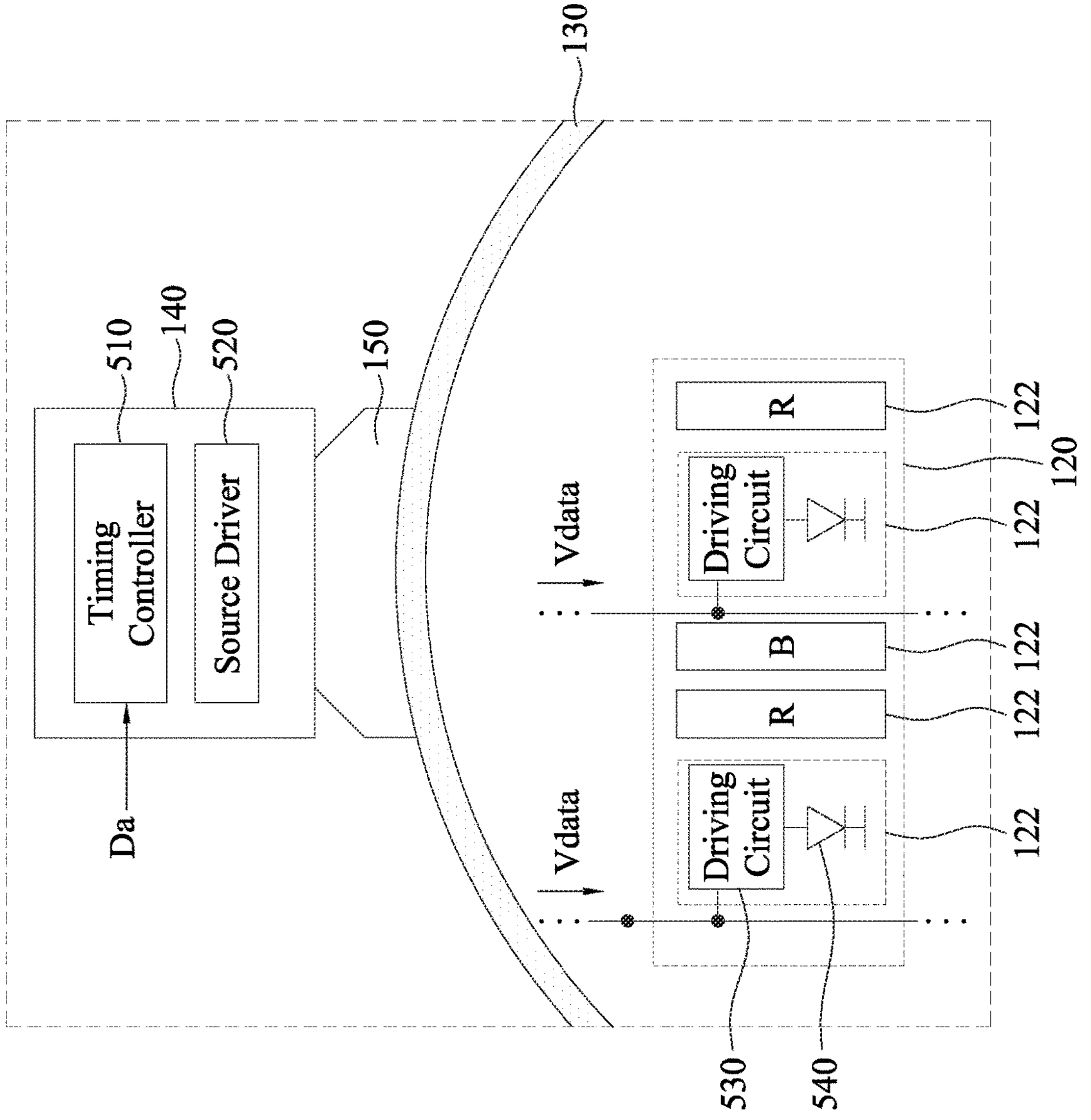
FIG. 5 is a partially enlarged schematic diagram of a display device in accordance with another embodiment of the present disclosure.
Figure 6:
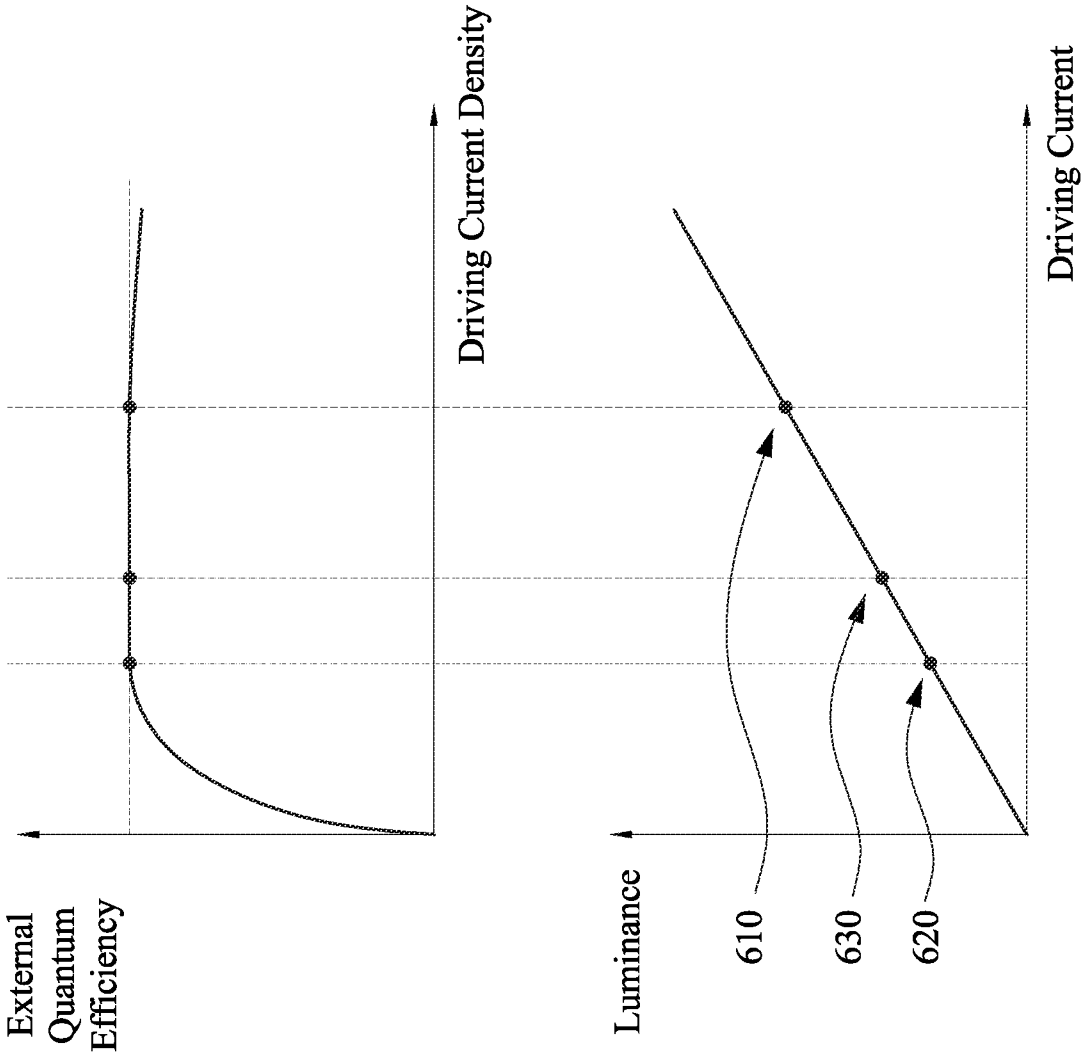
FIG. 6 is a schematic diagram of the relationship between the luminance and the driving current of a sub-pixel.

Embodiments in which the sub-pixels 122 of the same color are assigned to have different luminance will be further described below with reference to FIGS. 5-6. FIG. 5 is a partially enlarged schematic diagram of a display device 100 in accordance with another embodiment of the present disclosure. The sub-pixels 122 in FIG. 5 have the horizontal arrangement discussed in conjunction with FIG. 2A, but the present disclosure is not limited thereto. The following descriptions in conjunction with FIGS. 5-6 are also applicable to other types of arrangement of the sub-pixels 122, such as the embodiments in FIGS. 2B-2C. The driving chip 140 includes a timing controller 510 and a source driver 520, wherein the timing controller 510 is configured to receive display data Da. For the convenience of description, FIG. 5 only shows a representative auxiliary pixel 120, and the ordinary pixels 110 are omitted. The auxiliary pixel 120 includes two red sub-pixels 122 (indicated by the letter "R"), two green sub-pixels 122 (illustrated with internal circuits) and one blue sub-pixel 122 (indicated by the letter "B"). The red and blue sub-pixels 122 are similar to the green sub-pixels 122, and the difference lies in the colors of the light-emitting elements, thus the circuit structures of the red and blue sub-pixels 122 are omitted in FIG. 5. The operation of the embodiment of FIG. 5 will be described below by taking the green sub-pixel 122 as an example.

The timing controller 510 processes the green grayscale value associated with the auxiliary pixel 120 in the display data Da according to the number of the green sub-pixels 122 in the auxiliary pixel 120 to generate a plurality of processed green grayscale values. The green grayscale value is used to assign the target luminance of the green light generated by the auxiliary pixel 120. The plurality of processed green grayscale values are used to assign the luminance of a plurality of green sub-pixels 122, respectively, so that the total luminance of the green sub-pixels 122 is substantially equal to the target luminance, wherein the luminance of the plurality of green sub-pixels 122 may be the same or different. The source driver 320 is configured to provide a plurality of data voltage Vdata to the plurality of green sub-pixels 122 according to the plurality of processed green grayscale values. The green sub-pixel 122 includes a driving circuit 530 and a light-emitting element 540, wherein the driving circuit 530 is configured to provide a driving current to the light-emitting element 540 according to the data voltage Vdata to make the light-emitting element 540 emit light.

Please refer to FIGS. 5-6 at the same time. FIG. 6 is a schematic diagram of the relationship between the luminance and the driving current of the green sub-pixel 122. In FIG. 6, the target luminance is indicated by a reference numeral 610, and the luminance of the plurality of green sub-pixel 122 is indicated by reference numerals 620 and 630. The target luminance (indicated by the reference numeral 610) and the current corresponding to the target luminance (hereinafter referred to as target current) in FIG. 6 can be understood as the luminance and current that a single green sub-pixel 112 of an ordinary pixel 110 would have when the ordinary pixel 110 provides the target luminance. The timing controller 510 can easily calculate the aforementioned processed grayscale values according to the linear relationship between the luminance and the driving current in FIG. 6 and/or a gamma correction curve stored in the source driver 520, so as to distribute the target luminance to the plurality of green sub-pixels 122 in a predetermined ratio, that is, there will be a predetermined ratio between the driving currents of the plurality of green sub-pixels 122. For example, since the auxiliary pixel 120 in FIG. 5 has two green sub-pixels 122, the luminance of the two green sub-pixels 122 may be two-fifths (indicated by the reference numeral 620) and three-fifths (indicated by the reference numeral 630) of the target luminance, respectively, or the luminance of the two green sub-pixels 122 may both be one-half of the target luminance, but the present disclosure is not limited thereto. The operations of the sub-pixels 122 of the other color in the auxiliary pixel 120 are similar to the aforementioned description about the green sub-pixel 122 and are not repeated here for the sake of brevity.

To better understand the advantages of the display device 100 provided by the present disclosure, the operations of the ordinary pixels 110 and the auxiliary pixels 120 when the display device 100 is used to display a monochrome image will be described below with reference to FIGS. 1-2A. In some embodiments, the display data Da is used to make the display device 100 generate a red image with a first grayscale value. For example, the display data Da may assign the target luminance of the red light generated by each ordinary pixel 110 and each auxiliary pixel 120 to correspond to the first grayscale value, so that each ordinary pixel 110 and each auxiliary pixel 120 is configured to generate blue light of 0 nits, red light of 100 nits (i.e., the target luminance) and green light of 0 nits, which make the user able to perceive the red light.

In this case, please refer to FIG. 2A, the red sub-pixel 112 of each ordinary pixel 110 will generate red light with the target luminance (e.g., 100 nits). The sum of the luminance of the two red sub-pixels 122 indicated by the letters "X" and "Y" in the auxiliary pixel 120 will be substantially equal to the target luminance (e.g., 100 nits), e.g., 40 nits and 60 nits, respectively, or 50 nits and 50 nits respectively. In other words, the sum of the luminance of the two red sub-pixels 122 indicated by the letters "X" and "Y" in the auxiliary pixel 120 is substantially equal to the luminance of the red sub-pixels 112 of the ordinary pixel 110. Therefore, according to this first grayscale value, both the ordinary pixel 110 and the auxiliary pixel 120 can provide red light with the target luminance to the user.

Similarly, in other embodiments, the display data Da is used to make the display device 100 generate a green image with a second grayscale value. The display data Da may assign the target luminance of the green light generated by each ordinary pixel 110 and each auxiliary pixel 120 to correspond to the second grayscale value, so that each ordinary pixel 110 and each auxiliary pixel 120 is configured to generate blue light of 0 nits, red light of 0 nits and green light of 100 nits (i.e., the target luminance), which make the user able to perceive the green light. The sum of the luminance of the two green sub-pixels 122 indicated by the letters "P" and "Q" in the auxiliary pixel 120 will be substantially equal to the target luminance (e.g., 100 nits). Therefore, according to this second grayscale value, both the ordinary pixel 110 and the auxiliary pixel 120 can provide green light with the target luminance to the user. The methods for generating the light of other colors are similar to the aforementioned descriptions, and are not repeated here for the sake of brevity.

In conclusion, even if the display device 100 displays a monochrome image that is easy to find flaws, the user will not observe the chromatic aberration at the boundary of the active area AA. Therefore, the display device 100 and the pixel structure including the ordinary pixels 110 and the auxiliary pixels 120 provided by the present disclosure are suitable for various applications that require high-quality non-rectangular images.

Certain terms are used in the description and claim to refer to particular elements. However, it should be understood by those skilled in the art that the same elements may be referred to by different terms. The description and the claims do not take the difference in name as a way of distinguishing elements, but take the difference in function of the elements as a basis for distinguishing. The term "comprising" mentioned in the description and the claims is an open-ended term, so it should be interpreted as "including but not limited to". In addition, the term "coupled" herein includes any direct and indirect means of connection. Therefore, if it is described in the description and the claims that the first element is coupled to the second element, it means that the first element may be directly connected to the second element through electrical connection or signal connection such as wireless transmission or optical transmission, or through other elements or connections.

As used herein, the term "and/or" includes any combination of one or more of the mentioned elements. Unless otherwise specified in the description, any term in the singular also includes the meaning in the plural.

The above are preferred embodiments of the present disclosure, and various modifications and equivalent changes may be made to the structure of the present disclosure without departing from the scope or spirit of the present disclosure. In view of the foregoing, it is intended that the present disclosure cover modifications and variations of this invention provided they fall within the scope of the following claims.

What is claimed is:

1. A display device, comprising:

a plurality of ordinary pixels, respectively including a first color sub-pixel;

an auxiliary pixel, including a plurality of first color sub-pixels, wherein a light-emitting area in each of the plurality of first color sub-pixels in the auxiliary pixel and a light-emitting area in the first color sub-pixel of each of the plurality of ordinary pixels are the same with each other;

a frame, configured to define an active area in a non-rectangular shape, wherein the plurality of ordinary pixels and the auxiliary pixel are arranged in the active area; and a driving chip, configured to receive a display data, wherein the display data includes a first color grayscale value configured to assign a first target luminance of the first color sub-pixel to one of the ordinary pixel;

wherein in response to the one of the ordinary pixel and the auxiliary pixel each receives display data with identical first color grayscale value, the driving chip is configured to generate one or more processed first color grayscale values according to the first color grayscale value, the one or more processed first color grayscale values are configured to assign a luminance to each of the plurality of first color sub-pixels of the auxiliary pixel, and the sum of the luminance of the plurality of first color sub-pixels of the auxiliary pixel is substantially equal to the first target luminance.

2. The display device of claim 1, wherein the one or more processed first color grayscale values include only one processed first color grayscale value and the processed first color grayscale value is configured to assign the plurality of first color sub-pixels of the auxiliary pixel to have equal luminance.

3. The display device of claim 2, wherein the plurality of first color sub-pixels of the auxiliary pixel are configured to receive a same data voltage from a data line.

4. The display device of claim 1, wherein the plurality of first color sub-pixels of the auxiliary pixel include a first sub-pixel and a second sub-pixel, the first sub-pixel is closer to the frame than the second sub-pixel, and the luminance of the first sub-pixel is lower than the luminance of the second sub-pixel.

5. The display device of claim 1, wherein the vertical projections of the plurality of light-emitting areas of the auxiliary pixel on a substrate of the display device do not overlap the vertical projections of the frame on the substrate.

6. The display device of claim 1, wherein the plurality of ordinary pixels and the auxiliary pixel are LED pixels.

7. The display device of claim 1, wherein the auxiliary pixel includes a plurality of second color sub-pixels, the display data includes a second color grayscale value, and the second color grayscale value is configured to assign a second target luminance of a second color light of the auxiliary pixel, wherein the driving chip is configured to generate one or more processed second color grayscale values according to the second color grayscale value, the one or more processed second color grayscale values are configured to assign the luminance of the plurality of second color sub-pixel, and the sum of the luminance of the plurality of second color sub-pixels is substantially equal to the second target luminance.

8. A display device, comprising:

a plurality of ordinary pixels, wherein each of the plurality of ordinary pixels includes a first color sub-pixel;

an auxiliary pixel, including a plurality of first color sub-pixels, wherein a light-emitting area in each of the plurality of first color sub-pixels in the auxiliary pixel and a light-emitting area in the first color sub-pixel of each of the plurality of ordinary pixels are the same with each other; and a frame, configured to define an active area in a non-rectangular shape, wherein the plurality of ordinary pixels and the auxiliary pixel are arranged in the active area, wherein, in response to a display data input to the display device assigns a same grayscale value to each of the plurality of ordinary pixels and the auxiliary pixel respectively to generate a first color light with the same luminance, respectively, the sum of the generated luminance of the plurality of first color sub-pixels of the auxiliary pixel is configured to be substantially equal to the luminance of the first color sub-pixel of one of the plurality of ordinary pixels.

9. The display device of claim 8, wherein the plurality of first color sub-pixels of the auxiliary pixel are configured to have equal luminance.

10. The display device of claim 9, wherein the plurality of first color sub-pixels of the auxiliary pixel are configured to receive a same data voltage from a data line.

11. The display device of claim 8, wherein the plurality of first color sub-pixels of the auxiliary pixel include a first sub-pixel and a second sub-pixel, the first sub-pixel is closer to the frame than the second sub-pixel, and the luminance of the first sub-pixel is lower than the luminance of the second sub-pixel.

12. The display device of claim 8, wherein each of the plurality of ordinary pixels includes a second color sub-pixel and the auxiliary pixel includes a plurality of second color sub-pixels, when the display data input to the display device assigns the plurality of ordinary pixels and the auxiliary pixel to generate a second color light with the same luminance, the sum of the luminance of the plurality of second color sub-pixels of the auxiliary pixel is substantially equal to the luminance of the second color sub-pixel of one of the plurality of ordinary pixels.

13. A pixel structure, comprising:

an ordinary pixel, including a plurality of color sub-pixels, wherein only one of the plurality of color sub-pixels is a first color sub-pixel; and an auxiliary pixel, including a plurality of the first color sub-pixels, wherein a light-emitting area in each of the plurality of first color sub-pixels in the auxiliary pixel and a light-emitting area in the first color sub-pixel of ordinary pixels are the same with each other;

wherein, in response to the ordinary pixel and the auxiliary pixel each being assigned with a first color grayscale of identical value to generate a first color light with a same luminance, respectively, the sum of the generated luminance of the plurality of first color sub-pixels of the auxiliary pixel is configured to be substantially equal to the luminance of the first color sub-pixel of the ordinary pixel.

14. The pixel structure of claim 13, wherein the plurality of first color sub-pixels of the auxiliary pixel are configured to have equal luminance.

15. The pixel structure of claim 14, wherein the plurality of first color sub-pixels of the auxiliary pixel are configured to receive a same data voltage from a data line.

16. The pixel structure of claim 13, wherein, when the ordinary pixel and the auxiliary pixel are arranged in a display device, the auxiliary pixel is closer to a frame of the display device than the ordinary pixel, wherein the frame is configured to define an active area of the display device in a non-rectangular shape, and the ordinary pixel and the auxiliary pixel are arranged in the active area.

17. The pixel structure of claim 16, wherein the plurality of first color sub-pixels of the auxiliary pixel include a first sub-pixel and a second sub-pixel, the first sub-pixel is closer to the frame than the second sub-pixel, and the luminance of the first sub-pixel is lower than the luminance of the second sub-pixel.

18. The pixel structure of claim 16, wherein the vertical projections of the plurality of light-emitting areas of the auxiliary pixel on a substrate of the display device do not overlap the vertical projections of the frame on the substrate.

19. The pixel structure of claim 13, wherein the ordinary pixel and the auxiliary pixel are LED pixels.

20. The pixel structure of claim 13, wherein the ordinary pixel includes a second color sub-pixel and the auxiliary pixel includes a plurality of second color sub-pixels, when the ordinary pixel and the auxiliary pixel generate a second color light with the same luminance, the sum of the luminance of the plurality of second color sub-pixels of the auxiliary pixel is substantially equal to the luminance of the second color sub-pixel of the ordinary pixel.

* * * * *